United States Patent
Yoshida et al.

(10) Patent No.: US 10,090,722 B2
(45) Date of Patent: Oct. 2, 2018

(54) ROTATING MACHINERY WITH THREE-PHASE ARMATURE WINDINGS AND FIRST AND SECOND PARALLEL WINDINGS

(71) Applicant: MITSUBISHI HITACHI POWER SYSTEMS, LTD., Kanagawa (JP)

(72) Inventors: Jun Yoshida, Tokyo (JP); Kazuhiko Takahashi, Yokohama (JP); Norihito Yanagita, Yokohama (JP); Shigeki Tounosu, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 945 days.

(21) Appl. No.: 14/532,352

(22) Filed: Nov. 4, 2014

(65) Prior Publication Data
US 2015/0123508 A1    May 7, 2015

(30) Foreign Application Priority Data

Nov. 7, 2013 (JP) .................................. 2013-231090

(51) Int. Cl.
*H02K 3/12* (2006.01)
*H02K 3/14* (2006.01)
*H02K 3/28* (2006.01)

(52) U.S. Cl.
CPC ................. *H02K 3/12* (2013.01); *H02K 3/14* (2013.01); *H02K 3/28* (2013.01)

(58) Field of Classification Search
CPC .. H02K 3/28; H02K 3/12; H02K 3/14; H02K 15/0435

(Continued)

(56) References Cited

U.S. PATENT DOCUMENTS 2,778,962 A * 1/1957 Taylor ...................... H02K 3/28
                                                  310/198
3,408,517 A * 10/1968 Willyoung ............... H02K 3/28
                                                  310/198

(Continued)

FOREIGN PATENT DOCUMENTS

EP    2051350 A2    4/2009
FR    1527835 A     6/1968

(Continued)

OTHER PUBLICATIONS

Extended European Search Report received in corresponding European Application No. 14192241.9 dated Apr. 14, 2015.

*Primary Examiner* — John K Kim
*Assistant Examiner* — Minki Chang
(74) *Attorney, Agent, or Firm* — Mattingly & Malur, PC

(57) ABSTRACT

Rotating machinery of the invention includes a 2n-pole rotor, 72n slots, and three-phase armature windings (n≥1). Each of the slots houses a top coil on an inner radius side of the slots and a bottom coil on an outer radius side thereof. Each of the armature windings is formed by connecting the top and bottom coils and has 2n phase belts per phase. Each of the phase belts includes a first parallel winding and a second parallel winding. The top and bottom coils are formed by arranging the first and second parallel windings in a predefined order when a circumferential mean position of all top coils and bottom coils in each of the phase belts is defined as a phase belt center and an arrangement of the first and second parallel windings in at least one phase belt is viewed in an order of proximity to the phase belt center.

1 Claim, 10 Drawing Sheets

(58) Field of Classification Search
USPC .......................... 310/198, 202, 203, 206, 207
See application file for complete search history.

(56) References Cited

U.S. PATENT DOCUMENTS

| | | |
|---|---|---|
| 7,834,508 B2 | 11/2010 | Tokumasu et al. |
| 2008/0238240 A1* | 10/2008 | Takahashi ................ H02K 3/28 |
| | | 310/201 |

FOREIGN PATENT DOCUMENTS

| | | |
|---|---|---|
| GB | 858508 A | 1/1961 |
| GB | 858509 A | 1/1961 |
| JP | 5193557 B2 | 5/2013 |

* cited by examiner

ROTATING MACHINERY WITH THREE-PHASE ARMATURE WINDINGS AND FIRST AND SECOND PARALLEL WINDINGS

CLAIM OF PRIORITY

The present application claims priority from Japanese Patent Application JP 2013-231090 filed on Nov. 7, 2013, the content of which is hereby incorporated by reference into this application.

FIELD OF THE INVENTION

The present invention relates to rotating machinery, particularly to rotating machinery suitable for large generators such as turbine generators.

BACKGROUND OF THE INVENTION

Large capacity generators, which outputs large current, have large electromagnetic force and heat generation in their armature coils. To cope with this, an armature coil is constructed of a plurality of parallel circuits to reduce the current per coil and suppress the electromagnetic force and the temperature raise.

However, when the number of parallel circuits is not equal to a submultiple of the number of poles, the current of the parallel circuits is biased, producing a current circulating between the parallel circuits. This circulating current will increase a loss in an armature coil and raise the temperature of the coil, leading to a problem of degradation in efficiency and damage to coil insulation.

Here, first, a coil connection method for two-pole, two-parallel circuit configurations used mainly in large generators will be compared with a coil connection method for two-pole, four-parallel circuit configurations obtained by increasing the number of parallel circuits to four. Then a description will be given to the principle of the generation of a circulating current between circuits caused by the increase in the number of parallel circuits.

FIG. 15 illustrates an axial section of the stator of a generator. In the generator shown in FIG. 15, when the number of poles of the rotor 14 is two, the number of slots is 72 and, therefore, the number of slots per phase and per pole is 12. As shown in FIG. 15, the stator core 11 formed of magnetic steel sheets houses armature coils on the inner radius side. For this purpose, slots 5 extending in the axial direction are formed at predetermined intervals in the circumferential direction in the stator core 11. Teeth 4 are present between the slots 5 in the circumferential direction. Two armature coils are housed in each of the slots 5 on the upper and lower sides in the radial direction (inner and outer radius sides). The coils housed on the inner radius side are designated as top coil 12 and the coils housed on the outer radius side are designated as bottom coil 3.

FIG. 16 shows the stator illustrated in FIG. 15, developed in the circumferential direction. This drawing shows only the armature coils in the U phase of three phases, U, V, and W. The coordinate axis θ indicates the circumferential direction and Z indicates the axial direction. The coordinate axes in FIG. 15 and FIG. 16 indicate the same orientations.

As shown in FIG. 16, the top coils 12 and the bottom coils 3 are housed in the stator core 11 and cyclically arranged in the circumferential direction. Since the number of slots per phase and per pole is 12, the number of top coils 12 is 12 and the number of bottom coils 3 is 12 in each pole and, therefore, 24 coils are each present in two poles. Here, a coil group of the top coils 12 and bottom coils 3 arranged for one pole will be defined as phase belt. A phase belt 6 is equivalent to the coil group indicated by the reference character 6 in FIG. 16.

Here, U1 and U2 will be taken for two parallel circuits. In case of a two-pole, two-parallel circuit configuration, the currents of the parallel circuits are balanced by taking U1 as one phase belt 6 and U2 as another phase belt 6. As a result, a circulating current is not produced between the parallel circuits. However, when the number of the parallel circuits is increased to four for current reduction, it is necessary to place two parallel circuits U1 and U2 in one phase belt 6. In this case, the currents of U1 and U2 are brought out of balance and a circulating current is produced between the parallel circuits.

One of methods for suppressing a circulating current is changing the combination of coil connections. For example, U.S. Pat. No. 2,778,962 discloses a connection method for reducing the circulating current. FIG. 17 illustrates this method. FIG. 17 shows only one phase belt and another phase belt is identical to this phase belt. In FIG. 17, the stator core 11 is not shown.

In the method disclosed in U.S. Pat. No. 2,778,962, shown in FIG. 17, the coils are arranged by changing the combination of coil connections in consideration of the voltage balance when a parallel circuit is opened. Imbalance of the currents is thereby suppressed. However, seven jumper connections 8 for changing the combination of coil connections are used per phase belt at the axial end on the connection side where terminals 7 for taking out output are present. With this configuration, the number of phase belts is 6 for the three phases and thus 42 jumper connections 8 are required. This configuration increases the number of parts of the jumper connections 8 and complicates the joints of the jumper connections 8 and causes a problem of degraded workability.

JP 5,193,557 discloses a connection method for reducing the number of jumper connections 8. FIG. 18 illustrates this method. In the method disclosed in JP 5,193,557, shown in FIG. 18, contrivance is given to the relative positions of the top coils 12 and the bottom coils 3 in one of the phase belts, the relative positions defined by counting the positions of the coils in the direction away from the pole center. The number of the jumper connections 8 is thereby suppressed to 6 per phase belt and to 36 for the three phases. The number of the jumper connections 8 in the method disclosed in JP 5, 193, 557 is smaller than that in U.S. Pat. No. 2,778,962. However, a configuration in which the number of the jumper connections 8 is further smaller is desired in consideration of workability.

In the conventional technologies disclosed in U.S. Pat. No. 2,778,962 and JP 5,193,557, the number of the jumper connections 8 is large. This has been one of the causes that degrade workability and reliability in terms of the maintenance of the insulating strength of joints. Meanwhile, a configuration in which a jumper connection 8 is not used at all increases a circulating current between circuits and windings may be burnt because of resulting excessive heating.

SUMMARY OF THE INVENTION

The present invention has been made in consideration of the foregoing problems. An object of the present invention is to provide rotating machinery in which the number of jumper connections is reduced to suppress degradation in workability and a circulating current between circuits is suppressed not to result in burnout of the windings due to excessive heating even in a two-pole, four-parallel circuit configuration.

To achieve the above object, rotating machinery of the present invention includes a 2n-pole rotor, 72n slots, and three-phase armature windings (where n denotes an integer not less than 1), wherein each of the slots houses a top coil on an inner radius side of each of the slots and a bottom coil on an outer radius side thereof; each of the armature windings is formed by connecting the top coil and the bottom coil and has 2n phase belts per phase; each of the phase belts includes a first parallel winding and a second parallel winding; and the top coil and the bottom coil are formed by arranging the first and second parallel windings in a predefined order when a circumferential mean position of all top coils and bottom coils included in each of the phase belts is defined as a phase belt center and an arrangement of the first and second parallel windings in at least one phase belt is viewed in an order of proximity to the phase belt center.

Preferably, the first and second parallel windings are arranged in an order of the first, second, first, second, second, first, second, first, second, first, second, and first parallel windings in the top coil or the bottom coil; and the first and second parallel windings are arranged in an order of the first, second, first, second, first, second, second, first, second, first, second, and first parallel windings in the bottom coil connected to the top coil or the top coil connected to the bottom coil.

Preferably, the first and second parallel windings are arranged in an order of the first, second, first, second, first, second, second, first, second, first, second, and first parallel windings in the top coil or the bottom coil; and the first and second parallel windings are arranged in an order of the first, second, first, second, first, second, second, first, second, first, second, and first parallel windings in the bottom coil connected to the top coil or the top coil connected to the bottom coil.

Preferably, the first and second parallel windings are arranged in an order of the second, first, second, first, first, second, first, second, first, second, second, and first parallel windings in the top coil or the bottom coil; and the first and second parallel windings are arranged in an order of the second, first, second, first, second, first, second, first, first, second, first, and second parallel windings in the bottom coil connected to the top coil or the top coil connected to the bottom coil.

Preferably, the first and second parallel windings are arranged in an order of the second, first, first, second, first, second, second, first, second, first, second, and first parallel windings in the top coil or the bottom coil; and the first and second parallel windings are arranged in an order of the first, second, first, second, second, first, second, first, second, first, first, and second parallel windings in the bottom coil connected to the top coil or the top coil connected to the bottom coil.

Preferably, the first and second parallel windings are arranged in an order of the second, first, first, second, first, second, second, first, second, first, second, and first parallel windings in the top coil or the bottom coil; and the first and second parallel windings are arranged in an order of the first, second, first, second, first, second, second, first, second, first, first, and second parallel windings in the bottom coil connected to the top coil or the top coil connected to the bottom coil.

Preferably, the first and second parallel windings are arranged in an order of the second, first, first, second, first, second, second, first, second, first, second, and first parallel windings in the top coil or the bottom coil; and the first and second parallel windings are arranged in an order of the first, second, first, second, first, second, second, first, second, first, second, and first parallel windings in the bottom coil connected to the top coil or the top coil connected to the bottom coil.

Preferably, the first and second parallel windings are arranged in an order of the second, first, second, first, first, second, first, second, first, second, second, and first parallel windings in the top coil or the bottom coil; and the first and second parallel windings are arranged in an order of the first, second, first, second, second, first, second, first, second, first, first, and second parallel windings in the bottom coil connected to the top coil or the top coil connected to the bottom coil.

Preferably, the first and second parallel windings are arranged in an order of the second, first, first, first, second, second, second, second, first, first, second, and first parallel windings in the top coil or the bottom coil; and the first and second parallel windings are arranged in an order of the second, first, first, first, second, second, second, second, first, first, first, and second parallel windings in the bottom coil connected to the top coil or the top coil connected to the bottom coil.

Preferably, the first and second parallel windings are arranged in an order of the second, first, first, second, second, first, first, second, first, second, second, and first parallel windings in the top coil or the bottom coil; and the first and second parallel windings are arranged in an order of the first, second, second, first, second, first, first, second, second, first, first, and second parallel windings in the bottom coil connected to the top coil or the top coil connected to the bottom coil.

Preferably, the first and second parallel windings are arranged in an order of the second, first, first, second, first, second, first, second, second, second, first, and first parallel windings in the top coil or the bottom coil; and the first and second parallel windings are arranged in an order of the first, second, second, first, second, first, second, first, second, first, first, and second parallel windings in the bottom coil connected to the top coil or the top coil connected to the bottom coil.

Preferably, the first and second parallel windings are arranged in an order of the second, first, first, second, first, second, first, second, second, second, and first parallel windings in the top coil or the bottom coil; and the first and second parallel windings are arranged in an order of the first, second, second, first, second, first, second, first, first, first, second, and second parallel windings in the bottom coil connected to the top coil or the top coil connected to the bottom coil.

Preferably, the first and second parallel windings are arranged in an order of the first, second, second, first, first, second, first, second, second, first, second, and first parallel windings in the top coil or the bottom coil; and the first and second parallel windings are arranged in an order of the first, second, second, first, second, first, first, second, first, second, second, and first parallel windings in the bottom coil connected to the top coil or the top coil connected to the bottom coil.

Preferably, the first and second parallel windings are arranged in an order of the first, second, second, second, first, first, first, second, second, second, and first parallel windings or in an order of the first, second, second, first, first, second, second, first, first, second, second, and first parallel windings in the top coil and the bottom coil.

According to the present invention, it is possible to obtain rotating machinery in which the number of jumper connections is reduced to suppress degradation in workability and a circulating current between circuits is suppressed not to result in burnout of the windings due to excessive heating even in a two-pole, four-parallel circuit configuration.

DETAILED DESCRIPTION OF THE PREFERRED EMBODIMENTS

Figure 1:
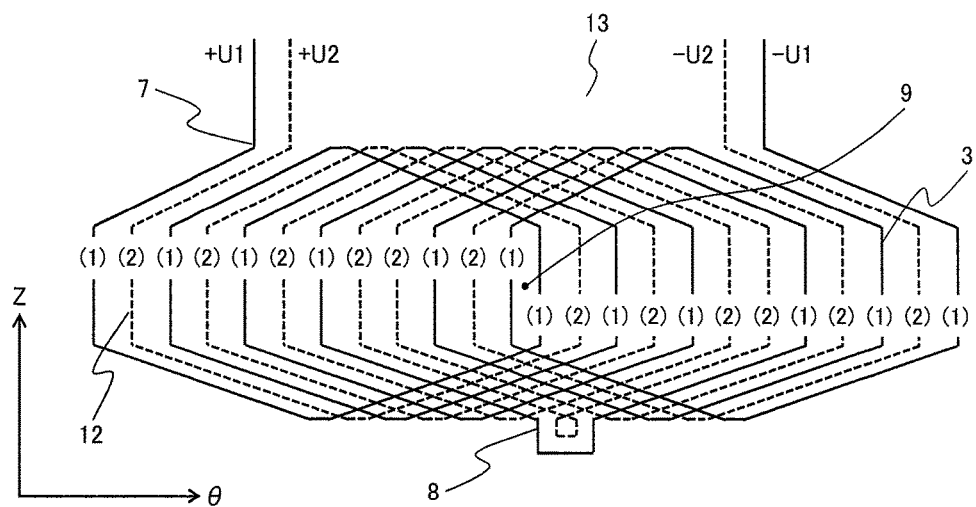
FIG. 1 is a drawing illustrating a connection method in one phase belt in rotating machinery according to the first embodiment of the present invention.

Hereafter, descriptions will be given to rotating machinery according to embodiments of the present invention with the drawings. In the following description of each of the embodiments and drawings, identical reference characters will be used for identical components. Note that a first parallel winding is denoted by the reference character "1" and a second parallel winding is denoted by the reference character "2" in the drawings and the following descriptions, however, alternatively, a first parallel winding can be denoted by the reference character "2" and a second parallel winding can be denoted by the reference character "1".

First Embodiment

FIG. 1 illustrates a connection method in one phase belt in rotating machinery according to the first embodiment of the present invention.

Figure 15:
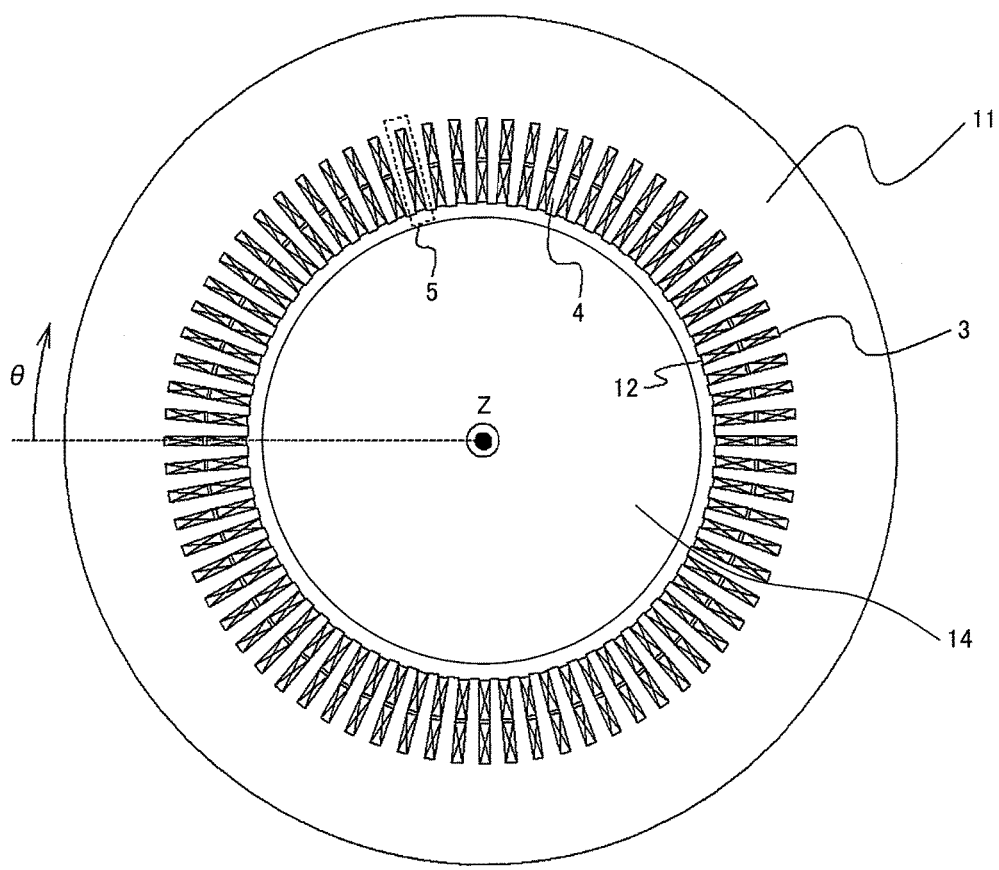
FIG. 15 is an axial sectional view of the stator of rotating machinery according to an embodiment of the present invention.
Figure 16:
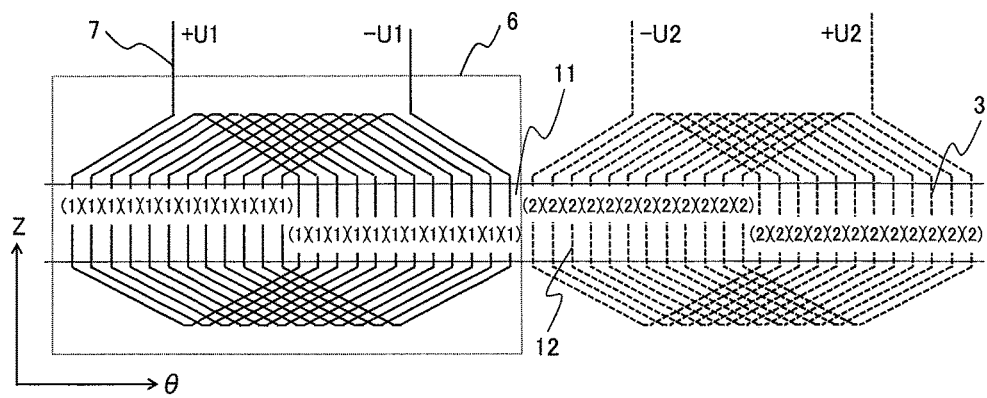
FIG. 16 is a connection diagram showing armature coils only in the U phase and terminals in a two-pole, two-parallel circuit configuration, obtained by developing the stator of the rotating machinery in FIG. 15 in the circumferential direction.
Figure 17:
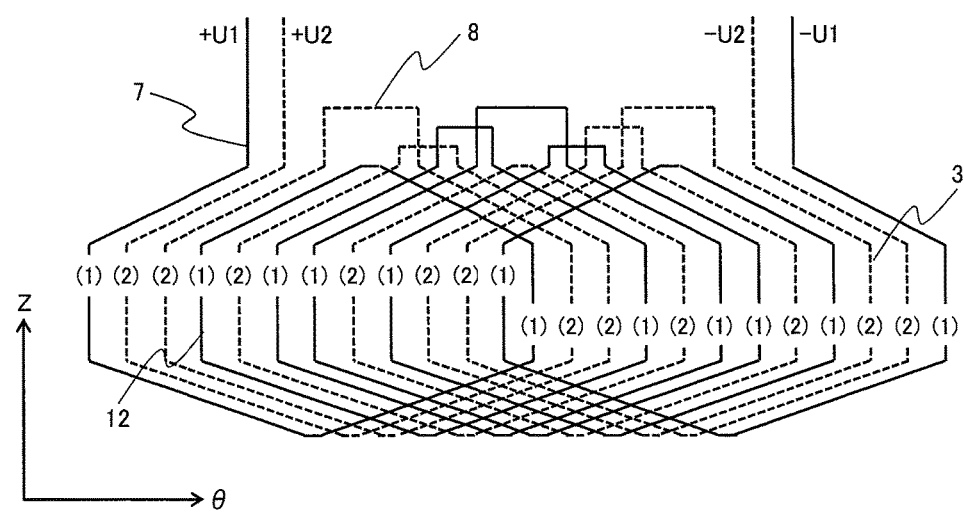
FIG. 17 is a drawing illustrating a connection method in a phase belt in conventional rotating machinery (disclosed in U.S. Pat. No. 2,778,962)
Figure 18:
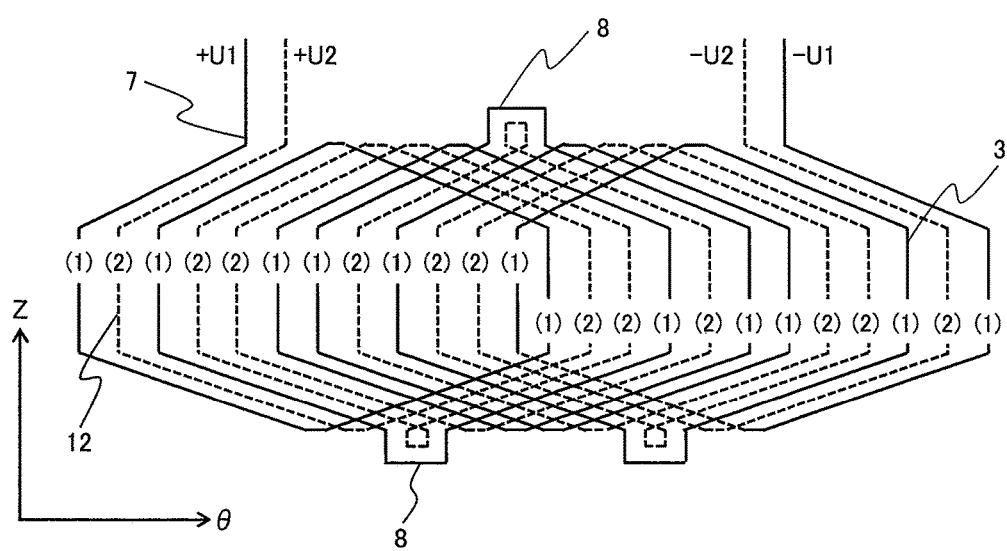
FIG. 18 is a drawing illustrating a connection method in a phase belt in conventional rotating machinery (disclosed in JP 5,193,557).

As illustrated in FIG. 1, rotating machinery according to this embodiment includes a 2n-pole rotor 14 (see FIG. 15, not shown in FIG. 1), 72n slots 5, and three-phase armature windings 13 (where n denotes an integer not less than 1). Each of the slots 5 houses a top coil 12 on the inner radius side of each of the slots 5 and a bottom coil 3 on the outer radius side thereof. Each of the armature windings 13 is formed by connecting the top coil 12 and the bottom coil 3 and has 2n phase belts 6 per phase. Each of the phase belts 6 includes a first parallel winding 1 and a second parallel winding 2. When the circumferential mean position of all the top coils 12 and bottom coils 3 included in each of the phase belts 6 is defined as the center of the phase belt 6 (phase belt center 9) and an arrangement of the first and second parallel windings 1, 2 in at least one phase belt 6 is viewed in the order of proximity to the phase belt center 9, the top coil 12 and the bottom coil 3 are formed by arranging the first and second parallel windings 1, 2 in a predefined order. In this embodiment, the first parallel winding 1 and the second parallel winding 2 are arranged in the order of the first, second, first, second, second, first, second, first, second, first, second, and first parallel windings in the top coil 12; and the first parallel winding 1 and the second parallel winding 2 are arranged in the order of the first, second, first, second, first, second, second, first, second, first, second, and first parallel windings in the bottom coil 3 connected to the top coil 12.

With the configuration in this embodiment, even in a two-pole, four-parallel circuit configuration, the number of jumper connections 8 per one phase belt 6 is only two on the non-connection side where terminals 7 are not present, reducing the number of the jumper connections 8. Since the number of the jumper connections 8 is reduced, degradation in workability is suppressed and, as the result of the improvement of workability, a production cost can be reduced. Since the number of joints of the jumper connections 8 is reduced, reliability is enhanced in terms of the securement of insulation performance and fixation strength. Since the jumper connections 8 are used, a circulating current between circuits can be suppressed and the effect of preventing burnout of the windings due to excessive heating is obtained.

Second Embodiment

Figure 2:
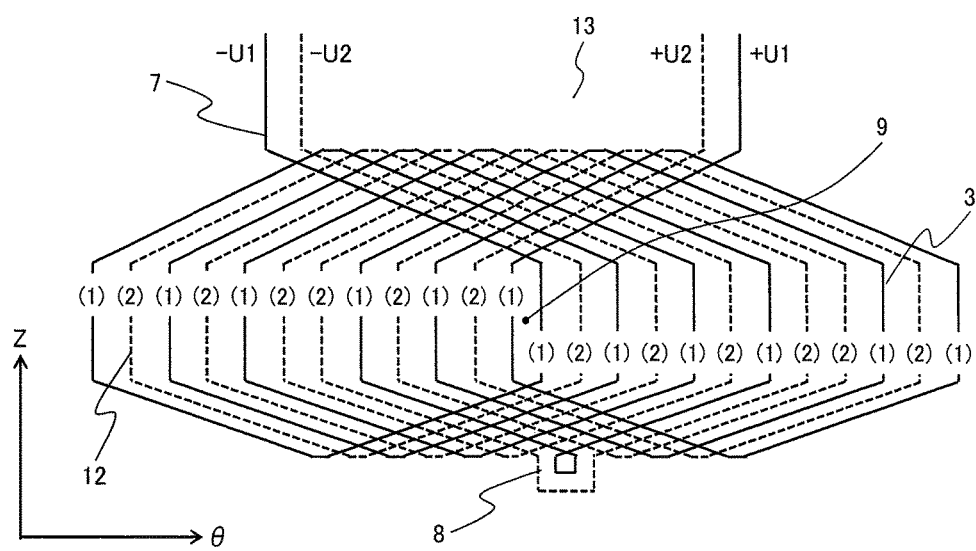
FIG. 2 is a drawing illustrating a connection method in one phase belt in rotating machinery according to the second embodiment of the present invention.

FIG. 2 illustrates a connection method for one phase belt in rotating machinery according to the second embodiment of the present invention. With this method, the number of the jumper connections 8 can be reduced to two.

In this embodiment, as shown in FIG. 2, the coil pitch on the terminal 7 side is changed and further the polarities of the parallel circuits are changed. In this embodiment, the first parallel winding 1 and the second parallel winding 2 are arranged in the order of the first, second, first, second, first, second, second, first, second, first, second, and first parallel windings in the top coil 12; and the first parallel winding 1 and the second parallel winding 2 are arranged in the order of the first, second, first, second, first, second, first, second, second, first, second, and first parallel windings in the bottom coil 3 connected to the top coil 12. Other configuration of the rotating machinery in this embodiment is the same as in the first embodiment.

Even with the configuration in this embodiment, the same effects as in the first embodiment can be obtained.

Third Embodiment

Figure 3:
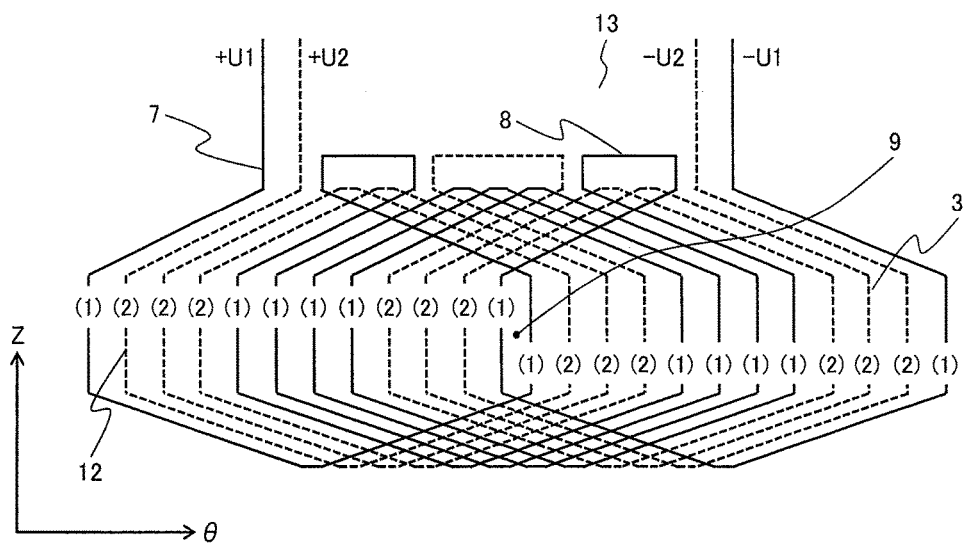
FIG. 3 is a drawing illustrating a connection method in one phase belt in rotating machinery according to the third embodiment of the present invention.

FIG. 3 illustrates a connection method for one phase belt in rotating machinery according to the third embodiment of the present invention. With this method, though the number of the jumper connections 8 is increased to three per one phase belt 6, a circulating current can be more reduced.

In this embodiment, as shown in FIG. 3, the first parallel winding 1 and the second parallel winding 2 are arranged in the order of the first, second, second, second, first, first, first, first, second, second, second, and first parallel windings in the top coil 12 and in the bottom coil 3. Other configuration of the rotating machinery in this embodiment is the same as in the first embodiment. As a result, the number of the jumper connections 8 per one phase belt 6 is only three on the connection side.

Even with the configuration in this embodiment, the same effects as in the first embodiment can be obtained.

Fourth Embodiment

Figure 4:
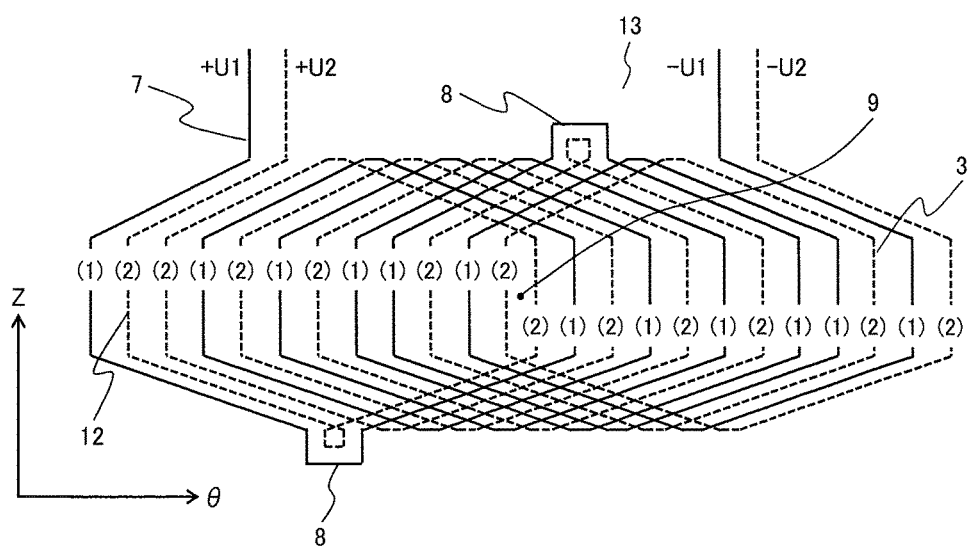
FIG. 4 is a drawing illustrating a connection method in one phase belt in rotating machinery according to the fourth embodiment of the present invention.

FIG. 4 illustrates a connection method for one phase belt in rotating machinery according to the fourth embodiment of the present invention. With this method, though the number of the jumper connections 8 is increased to four per one phase belt 6, a circulating current can be more reduced.

In this embodiment, as shown in FIG. 4, the first parallel winding 1 and the second parallel winding 2 are arranged in the order of the second, first, second, first, first, second, first, second, first, second, second, and first parallel windings in the top coil 12; and the first parallel winding 1 and the second parallel winding 2 are arranged in the order of the second, first, second, first, second, first, second, first, first, second, first, and second parallel windings in the bottom coil 3 connected to the top coil 12. Other configuration of the rotating machinery in this embodiment is the same as in the first embodiment. As a result, the number of the jumper connections 8 per one phase belt 6 is only four, two on the connection side and two on the non-connection side.

Even with the configuration in this embodiment, the same effects as in the first embodiment can be obtained.

Fifth Embodiment

Figure 5:
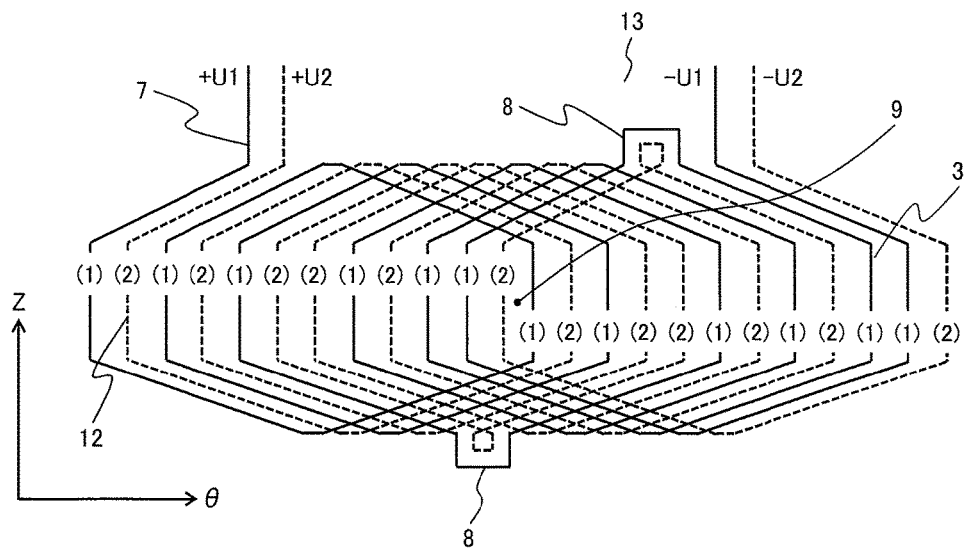
FIG. 5 is a drawing illustrating a connection method in one phase belt in rotating machinery according to the fifth embodiment of the present invention.

FIG. 5 illustrates a connection method for one phase belt in rotating machinery according to the fifth embodiment of the present invention. With this method, as in the fourth embodiment, though the number of the jumper connections 8 is increased to four per one phase belt 6, a circulating current can be more reduced.

In this embodiment, as shown in FIG. 5, the first parallel winding 1 and the second parallel winding 2 are arranged in the order of the second, first, first, second, first, second, second, first, second, first, second, and first parallel windings in the top coil 12; and the first parallel winding 1 and the second parallel winding 2 are arranged in the order of the first, second, first, second, second, first, second, first, second, first, first, and second parallel windings in the bottom coil 3 connected to the top coil 12. Other configuration of the rotating machinery in this embodiment is the same as in the first embodiment. As a result, the number of the jumper connections 8 per one phase belt 6 is only four, two on the connection side and two on the non-connection side.

Even with the configuration in this embodiment, the same effects as in the first embodiment can be obtained.

Sixth Embodiment

Figure 6:
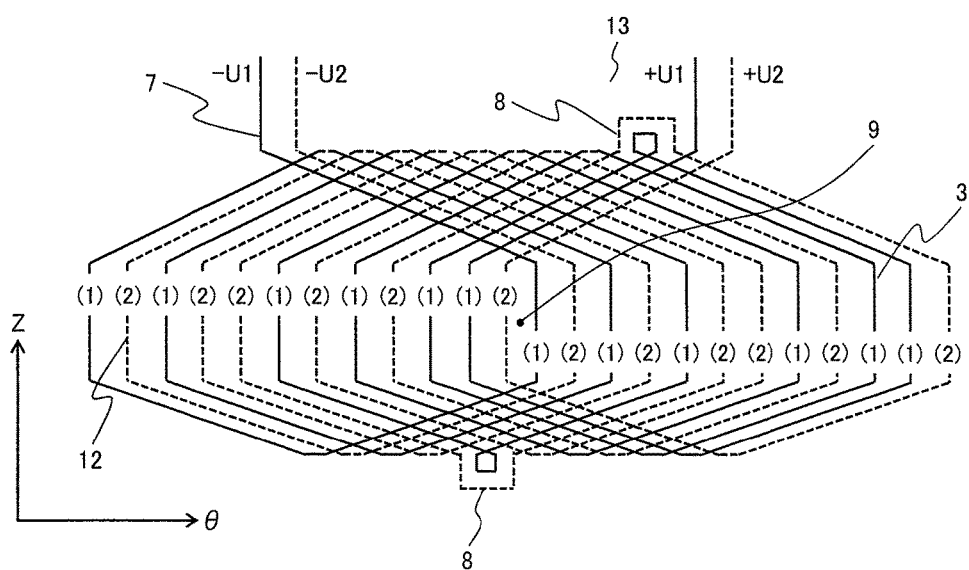
FIG. 6 is a drawing illustrating a connection method in one phase belt in rotating machinery according to the sixth embodiment of the present invention.

FIG. 6 illustrates a connection method for one phase belt in rotating machinery according to the sixth embodiment of the present invention. With this method, as in the fourth and fifth embodiments, though the number of the jumper connections 8 is increased to four per one phase belt 6, a circulating current can be more reduced.

In this embodiment, as shown in FIG. 6, the coil pitch on the terminal 7 side is changed and further the polarities of the parallel circuits are changed as in the second embodiment. The first parallel winding 1 and the second parallel winding 2 are arranged in the order of the second, first, first, second, first, second, first, second, second, first, second, and first parallel windings in the top coil 12; and the first parallel winding 1 and the second parallel winding 2 are arranged in the order of the first, second, first, second, first, second, second, first, second, first, first, and second parallel windings in the bottom coil 3 connected to the top coil 12. Other configuration of the rotating machinery in this embodiment is the same as in the first embodiment. As a result, the number of the jumper connections 8 per one phase belt 6 is only four, two on the connection side and two on the non-connection side.

Even with the configuration in this embodiment, the same effects as in the first embodiment can be obtained.

Seventh Embodiment

Figure 7:
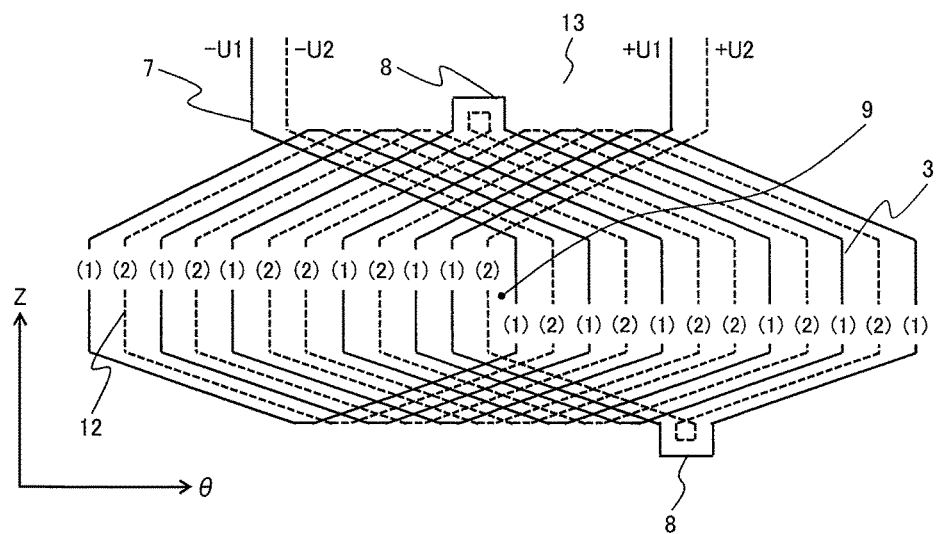
FIG. 7 is a drawing illustrating a connection method in one phase belt in rotating machinery according to the seventh embodiment of the present invention.

FIG. 7 illustrates a connection method for one phase belt in rotating machinery according to the seventh embodiment of the present invention. With this method, as in the fourth, fifth, and sixth embodiments, though the number of the jumper connections 8 is increased to four per one phase belt 6, a circulating current can be more reduced.

In this embodiment, as shown in FIG. 7, the coil pitch on the terminal 7 side is changed and further the polarities of the parallel circuits are changed as in the second and sixth embodiments. The first parallel winding 1 and the second parallel winding 2 are arranged in the order of the second, first, first, second, first, second, second, first, second, first, second, and first parallel windings in the top coil 12; and the first parallel winding 1 and the second parallel winding 2 are arranged in the order of the first, second, first, second, first, second, second, first, second, first, second, and first parallel windings in the bottom coil 3 connected to the top coil 12. Other configuration of the rotating machinery in this embodiment is the same as in the first embodiment. As a result, the number of the jumper connections 8 per one phase belt 6 is only four, two on the connection side and two on the non-connection side.

Even with the configuration in this embodiment, the same effects as in the first embodiment can be obtained.

Eighth Embodiment

Figure 8:
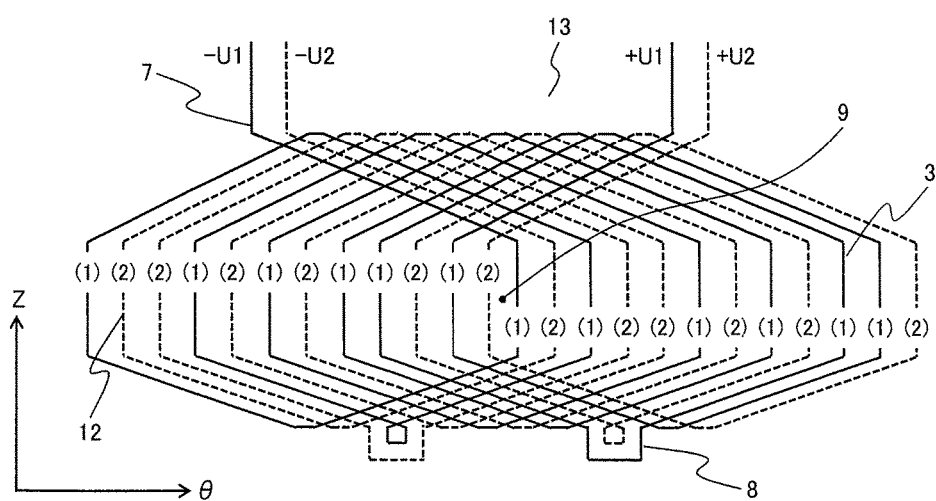
FIG. 8 is a drawing illustrating a connection method in one phase belt in rotating machinery according to the eighth embodiment of the present invention.

FIG. 8 illustrates a connection method for one phase belt in rotating machinery according to the eighth embodiment of the present invention. With this method, as in the fourth, fifth, sixth, and seventh embodiments, though the number of the jumper connections 8 is increased to four per one phase belt 6, a circulating current can be more reduced.

In this embodiment, as shown in FIG. 8, the coil pitch on the terminal 7 side is changed and further the polarities of the parallel circuits are changed as in the second, sixth, and seventh embodiments. The first parallel winding 1 and the second parallel winding 2 are arranged in the order of the second, first, second, first, first, second, first, second, first, second, second, and first parallel windings in the top coil 12; and the first parallel winding 1 and the second parallel winding 2 are arranged in the order of the first, second, first, second, second, first, second, first, second, first, first, and second parallel windings in the bottom coil 3 connected to the top coil 12. Other configuration of the rotating machinery in this embodiment is the same as in the first embodiment. As a result, the number of the jumper connections 8 per one phase belt 6 is only four on the non-connection side.

Even with the configuration in this embodiment, the same effects as in the first embodiment can be obtained.

Ninth Embodiment

Figure 9:
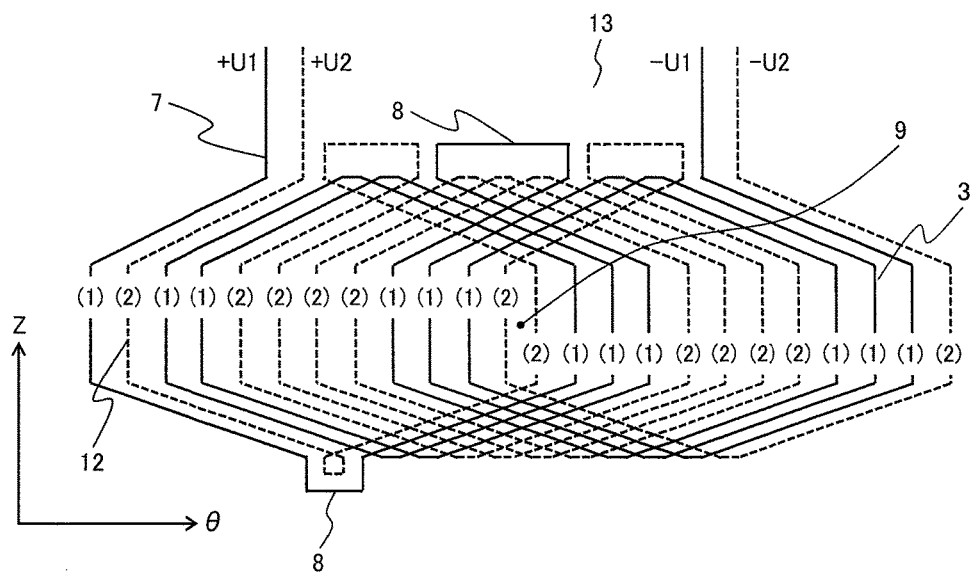
FIG. 9 is a drawing illustrating a connection method in one phase belt in rotating machinery according to the ninth embodiment of the present invention.

FIG. 9 illustrates a connection method for one phase belt in rotating machinery according to the ninth embodiment of the present invention. With this method, though the number of the jumper connections 8 is increased to five per one phase belt 6, a circulating current can be more reduced.

In this embodiment, as shown in FIG. 9, the first parallel winding 1 and the second parallel winding 2 are arranged in the order of the second, first, first, first, second, second, second, second, first, first, second, and first parallel windings in the top coil 12; and the first parallel winding 1 and the second parallel winding 2 are arranged in the order of the second, first, first, first, second, second, second, second, first, first, first, and second parallel windings in the bottom coil 3 connected to the top coil 12. Other configuration of the rotating machinery in this embodiment is the same as in the first embodiment. As a result, the number of the jumper connections 8 per one phase belt 6 is five, three on the connection side and two on the non-connection side.

Even with the configuration in this embodiment, the same effects as in the first embodiment can be obtained.

Tenth Embodiment

Figure 10:
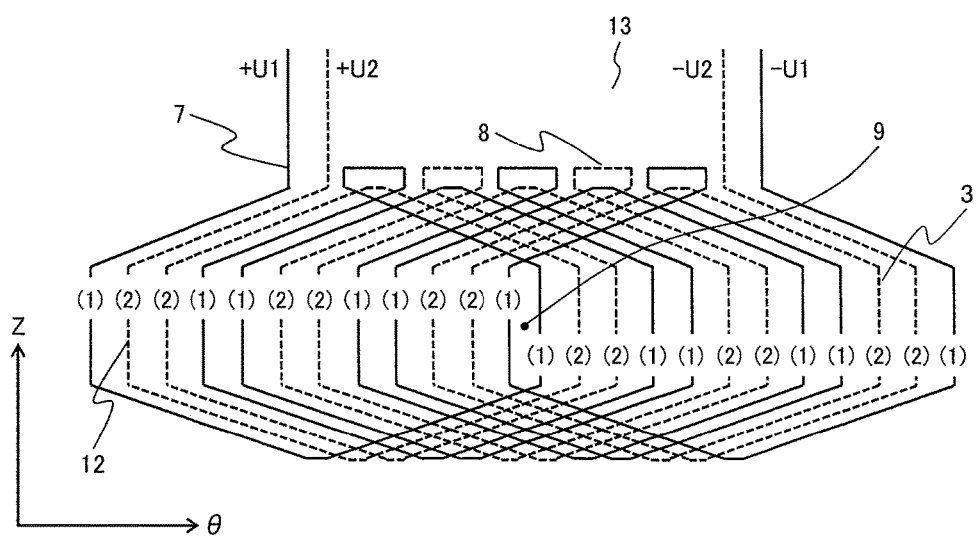
FIG. 10 is a drawing illustrating a connection method in one phase belt in rotating machinery according to the tenth embodiment of the present invention.

FIG. 10 illustrates a connection method for one phase belt in rotating machinery according to the tenth embodiment of the present invention. With this method, though the number of the jumper connections 8 is increased to five per one phase belt 6 as in the ninth embodiment, the number of components of the rotating machinery can be reduced because the number of types of the jumper connection 8 is one.

In this embodiment, as shown in FIG. 10, the first parallel winding 1 and the second parallel winding 2 are arranged in the order of the first, second, second, first, first, second, second, first, first, second, second, and first parallel windings in the top coil 12 and in the bottom coil 3. Other configuration of the rotating machinery in this embodiment is the same as in the first embodiment. As a result, the number of the jumper connections 8 per one phase belt 6 is five on the connection side.

Even with the configuration in this embodiment, the same effects as in the first embodiment can be obtained.

Eleventh Embodiment

Figure 11:
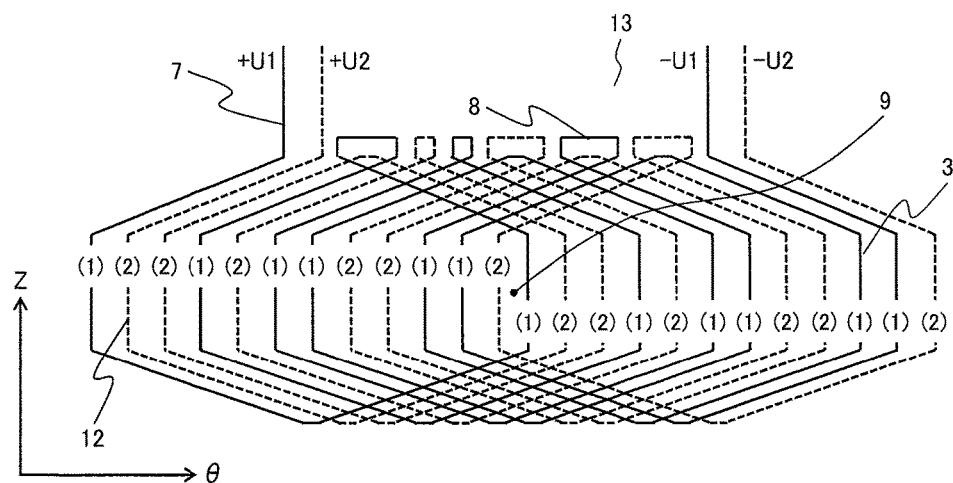
FIG. 11 is a drawing illustrating a connection method in one phase belt in rotating machinery according to the eleventh embodiment of the present invention.

FIG. 11 illustrates a connection method for one phase belt in rotating machinery according to the eleventh embodiment of the present invention. With this method, though the number of the jumper connections 8 is increased to six per one phase belt 6, a circulating current can be more reduced.

In this embodiment, as shown in FIG. 11, the first parallel winding 1 and the second parallel winding 2 are arranged in the order of the second, first, first, second, second, first, first, second, first, second, second, and first parallel windings in the top coil 12; and the first parallel winding 1 and the second parallel winding 2 are arranged in the order of the first, second, second, first, second, first, first, second, second, first, first, and second parallel windings in the bottom coil 3 connected to the top coil 12. Other configuration of the rotating machinery in this embodiment is the same as in the first embodiment. As a result, the number of the jumper connections 8 per one phase belt 6 is six on the connection side.

Even with the configuration in this embodiment, the same effects as in the first embodiment can be obtained.

Twelfth Embodiment

Figure 12:
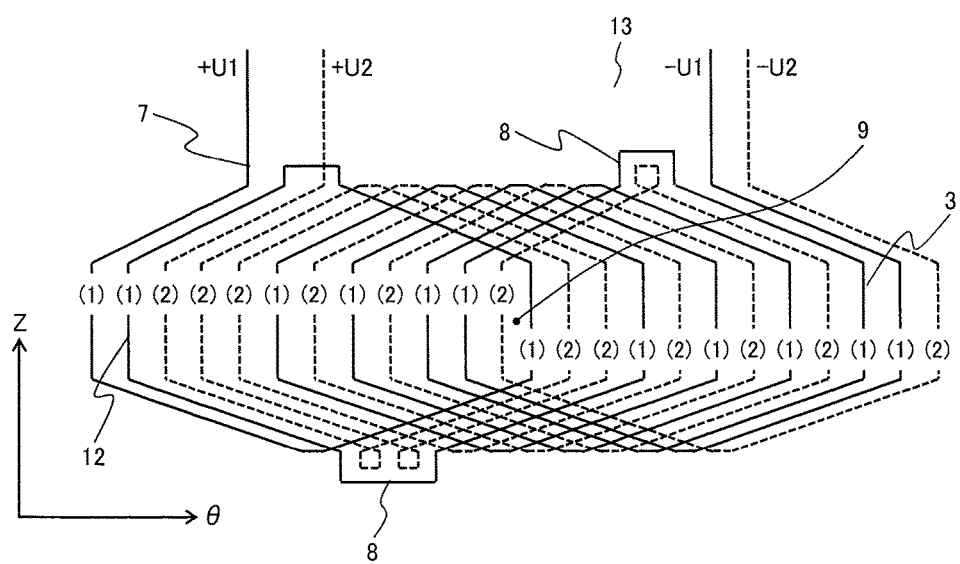
FIG. 12 is a drawing illustrating a connection method in one phase belt in rotating machinery according to the twelfth embodiment of the present invention.

FIG. 12 illustrates a connection method for one phase belt in rotating machinery according to the twelfth embodiment of the present invention. With this method, as in the eleventh embodiment, though the number of the jumper connections 8 is increased to six per one phase belt 6, a circulating current can be more reduced.

In this embodiment, as shown in FIG. 12, the first parallel winding 1 and the second parallel winding 2 are arranged in the order of the second, first, first, second, first, second, first, second, second, second, first, and first parallel windings in the top coil 12; and the first parallel winding 1 and the second parallel winding 2 are arranged in the order of the first, second, second, first, second, first, second, first, second, first, first, and second parallel windings in the bottom coil 3 connected to the top coil 12. Other configuration of the rotating machinery in this embodiment is the same as in the first embodiment. As a result, the number of the jumper connections 8 per one phase belt 6 is six, three on the connection side and three on the non-connection side.

Even with the configuration in this embodiment, the same effects as in the first embodiment can be obtained.

Thirteenth Embodiment

Figure 13:
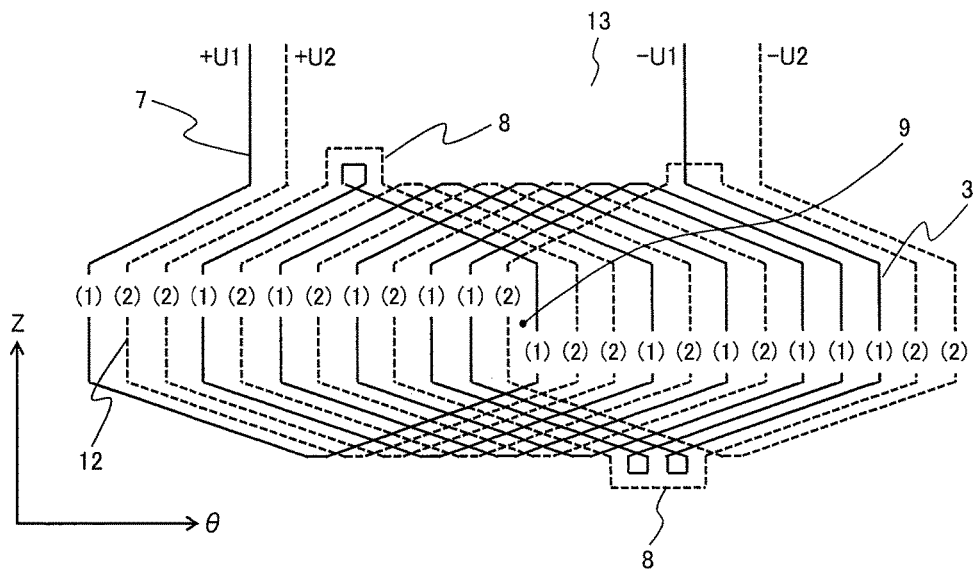
FIG. 13 is a drawing illustrating a connection method in one phase belt in rotating machinery according to the thirteenth embodiment of the present invention.

FIG. 13 illustrates a connection method for one phase belt in rotating machinery according to the thirteenth embodiment of the present invention. With this method, as in the eleventh and twelfth embodiments, though the number of the jumper connections 8 is increased to six per one phase belt 6, a circulating current can be more reduced.

In this embodiment, as shown in FIG. 13, the first parallel winding 1 and the second parallel winding 2 are arranged in the order of the second, first, first, second, first, second, first, second, first, second, second, and first parallel windings in the top coil 12; and the first parallel winding 1 and the second parallel winding 2 are arranged in the order of the first, second, second, first, second, first, second, first, first, first, second, and second parallel windings in the bottom coil 3 connected to the top coil 12. Other configuration of the rotating machinery in this embodiment is the same as in the first embodiment. As a result, the number of the jumper connections 8 per one phase belt 6 is six, three on the connection side and three on the non-connection side.

Even with the configuration in this embodiment, the same effects as in the first embodiment can be obtained.

Fourteenth Embodiment

Figure 14:
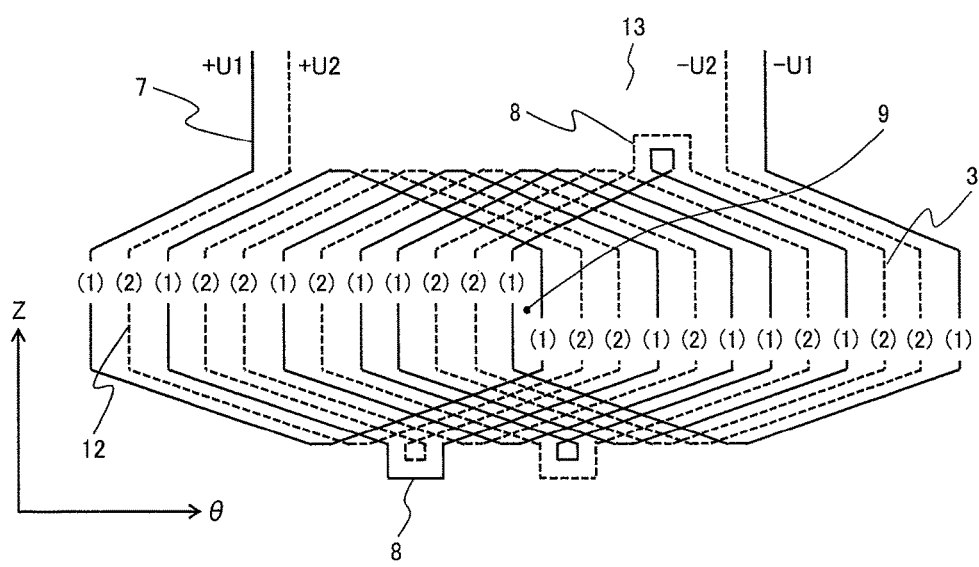
FIG. 14 is a drawing illustrating a connection method in one phase belt in rotating machinery according to the fourteenth embodiment of the present invention.

FIG. 14 illustrates a connection method for one phase belt in rotating machinery according to fourteenth embodiment of the present invention. With this method, as in the eleventh and twelfth embodiments, though the number of the jumper connections 8 is increased to six per one phase belt 6, a circulating current can be more reduced.

In this embodiment, as shown in FIG. 14, the first parallel winding 1 and the second parallel winding 2 are arranged in the order of the first, second, second, first, first, second, first, second, second, first, second, and first parallel windings in the top coil 12; and the first parallel winding 1 and the second parallel winding 2 are arranged in the order of the first, second, second, first, second, first, first, second, first, second, second, and first parallel windings in the bottom coil 3 connected to the top coil 12. Other configuration of the rotating machinery in this embodiment is the same as in the first embodiment. As a result, the number of the jumper connections 8 per one phase belt 6 is six, two on the connection side and four on the non-connection side.

Even with the configuration in this embodiment, the same effects as in the first embodiment can be obtained.

Note that the combination of the top coil 12 and the bottom coil 3 can be inverted in the wire connections described in the first to fourteenth embodiments. For example, the first parallel winding 1 and the second parallel winding 2 can be arranged in the order of the first, second, first, second, first, second, second, first, second, first, second, and first parallel windings from the phase belt center 9 in the top coil 12; and the first parallel winding 1 and the second parallel winding 2 can be arranged in the order of the first, second, first, second, second, first, second, first, second, first, second, and first parallel windings in the bottom coil 3 connected to the top coil 12. Even with this configuration, the same effects as in the first embodiment can be obtained.

The wire connections described in the first to fourteenth embodiments, which are configured for one phase belt 6 in the embodiments, can be combined because there are six phase belts 6 in two-pole rotating machinery. In a case where the wire connections are combined, effects can be obtained depending on the combination.

The wire connections described in the first to fourteenth embodiments are configurations in two-pole, 72-slot, and four-parallel circuit rotating machinery. When "n" is an integer not less than 1, the number of slots per phase and per pole is also 12 in 2n-pole, 72n-slot, and 4n-parallel circuit rotating machinery, to which the first to fourteenth embodiments are obviously applicable.

The present invention is not limited to the above-mentioned embodiments and includes various modifications. The above embodiments are described in detail for better understanding of the present invention and the present invention does not necessarily require all the configuration elements mentioned above. Apart of the configuration of some embodiment can be substituted by a configuration element of any other embodiment and a configuration element of some embodiment can also be added to the configuration of another embodiment. In addition, a part of the configuration elements of the embodiments can be deleted, added with, or substituted by any other configuration element.

DESCRIPTION OF THE REFERENCE CHARACTERS

1 - - - first parallel winding
2 - - - second parallel winding
3 - - - bottom coil
4 - - - teeth
5 - - - slot
6 - - - phase belt
7 - - - terminal
8 - - - jumper connection
9 - - - phase belt center
11 - - - stator core
12 - - - top coil
13 - - - armature windings
14 - - - rotor

What is claimed is:

1. Rotating machinery comprising a 2n-pole rotor, 72n slots, and three-phase armature windings, where n denotes an integer not less than 1, wherein:

each of the slots houses a top coil on an inner radius side of each of the slots and a bottom coil on an outer radius side thereof;

each of the armature windings is formed by connecting the top coil and the bottom coil and has 2n phase belts per phase;

each of the phase belts includes a first parallel winding and a second parallel winding;

the top coil and the bottom coil are formed by arranging the first and second parallel windings in a predefined order when a circumferential mean position of all top coils and bottom coils included in each of the phase belts is defined as a phase belt center and an arrangement of the first and second parallel windings in at least one phase belt is viewed in an order of proximity to the phase belt center;

the first and second parallel windings are arranged in an order of the first, second, second, first, first, second, first, second, second, first, second, and first parallel windings in the top coil or the bottom coil; and the first and second parallel windings are arranged in an order of the first, second, second, first, second, first, first, second, first, second, second, and first parallel windings in the bottom coil connected to the top coil or the top coil connected to the bottom coil.

* * * * *